(12) United States Patent
Inoue

(10) Patent No.: US 8,390,595 B2
(45) Date of Patent: Mar. 5, 2013

(54) LIQUID CRYSTAL DISPLAY AND ELECTRONIC DEVICE

(75) Inventor: Masahide Inoue, Hyogo (JP)

(73) Assignee: Chimei Innolux Corporation, Miao-Li County (TW)

( * ) Notice: Subject to any disclaimer, the term of this patent is extended or adjusted under 35 U.S.C. 154(b) by 326 days.

(21) Appl. No.: 12/779,983

(22) Filed: May 14, 2010

(65) Prior Publication Data

US 2010/0289767 A1 Nov. 18, 2010

(30) Foreign Application Priority Data

May 15, 2009 (JP) ................................. 2009-118818

(51) Int. Cl.
G06F 3/045 (2006.01)

(52) U.S. Cl. ........................................ 345/174; 345/173

(58) Field of Classification Search ........................ None
See application file for complete search history.

(56) References Cited

U.S. PATENT DOCUMENTS

| | | | |
|---|---|---|---|
| 2005/0134751 A1* | 6/2005 | Abileah et al. | 349/42 |
| 2008/0100590 A1* | 5/2008 | Hur et al. | 345/173 |
| 2008/0165154 A1* | 7/2008 | Kim | 345/173 |
| 2009/0115741 A1* | 5/2009 | Wang et al. | 345/173 |

FOREIGN PATENT DOCUMENTS

| | | |
|---|---|---|
| JP | 07302168 A | 11/1995 |
| JP | 07334289 A | 12/1995 |
| JP | 2008-146464 | 6/2008 |
| WO | WO 2007/034591 | 3/2007 |
| WO | WO 2009123388 A1 * | 10/2009 |

OTHER PUBLICATIONS

Japanese language office action dated Apr. 19, 2011.
English language translation of office action.
English language translation of abstract of WO 2007/034591 (published Mar. 29, 2007).
English language translation of abstract of JP 2008-146464 (published Jun. 26, 2008).
English abstract of JP07-302168, pub. Nov. 14, 1995.
English abstract of JP07-334289, pub. Dec. 22, 1995.

* cited by examiner

*Primary Examiner* — Lixi C Simpson
(74) *Attorney, Agent, or Firm* — McClure, Qualey & Rodack, LLP

(57) ABSTRACT

A liquid crystal display including a first substrate, a second substrate, a plurality of sensors, and a position detection device is disclosed. The first substrate includes a plurality of pixel electrodes. The second substrate includes at least one opposite electrode and passed through by light. A liquid crystal component is enclosed between the first and the second substrates, and a voltage between the first and the second substrates is controlled to display an image. The sensors are disposed on peripheral portions of the first and the second substrates and output signals corresponding to relative positions of the first and the second substrates. The position detection device receives the signals output from the sensors to determine a touched position on the glass substrate.

5 Claims, 9 Drawing Sheets

LIQUID CRYSTAL DISPLAY AND ELECTRONIC DEVICE

CROSS REFERENCE TO RELATED APPLICATIONS

This application claims priority of Japanese Patent Application No. 2009118818, filed on May 15, 2009, the entirety of which is incorporated by reference herein.

BACKGROUND OF THE INVENTION

1. Field of the Invention

The invention relates to a liquid crystal display and an electronic device, and more particularly to a liquid crystal display and an electronic device with a touch function.

2. Description of the Related Art

Personal computers, mobile phones, and mobile information terminal apparatuses are commonly used information devices. In an information device, a touch panel device may be utilized. Thus, an object, such as a finger or a stylus pen, is utilized to input information or issue commands when a liquid crystal display displays information and comprises a touch function. Conventional methods are disclosed in Japanese Patents 07-302168 and 07-334289.

To achieve the touch function, a touch panel is combined with a liquid crystal display. However, transmittance, reflectance, or contrast ration of the liquid crystal display comprising the touch panel is reduced. Thus, display effect of the liquid crystal display is reduced.

Accordingly, a photo sensor within each pixel of a liquid crystal display to form a photo sensor array has been disclosed. The photo sensor array is capable of detecting light variations. When an object touches the liquid crystal display, the touched position can be determined according to the detection result.

However, transmittance, reflectance, or contrast ration of the liquid crystal display utilizing the photo sensor array is also reduced. Thus, display effect of the liquid crystal display is reduced. Further, an external encoder is required to analyze the signal provided by the photo sensor array. Thus, cost is increased and the structure of the liquid crystal display is made more complex. Additionally, the capacitor sensors are easily affected by external noise.

BRIEF SUMMARY OF THE INVENTION

A liquid crystal display and an electronic device are provided. A plurality of sensors are disposed at the peripheral portions of the two substrates to output signals corresponding to the relative positions of the substrates. If an object touches one substrate, the touched position can be determined according to the signal output from the sensors. Thus, the touched position is determined according to a simply structure. Meanwhile, the display effect of the liquid crystal display is not reduced.

An exemplary embodiment of a liquid crystal display comprises a first substrate, a second substrate, a plurality of sensors, and a position detection device. The first substrate comprises a plurality of pixel electrodes. The second substrate comprises at least one opposite electrode. The second substrate can be passed through by light. A liquid crystal component is enclosed between the first and the second substrates. A voltage between the first and the second substrates is controlled to display an image. The sensors are disposed at peripheral portions of the first and the second substrates and output signals corresponding to relative positions of the first and the second substrates. The position detection device receives the signals output from the sensors to determine a touched position on the glass substrate.

In the liquid crystal display, a space exists between the first and the second substrates, and the sensors are disposed at the space and coupled to the first and the second substrates.

In the liquid crystal display, each sensor comprises a first electrode, a second electrode. The first electrode is opposite to the second electrode. The first electrode is fixed on the first substrate. The second electrode is fixed on the second substrate. The position detection device detects variations of the electrostatic capacitance between the first and the second electrodes when the relative position between the first and the second substrates is changed.

A method and apparatus for a portable device are provided. An exemplary embodiment of a method for a portable device is described in the following.

The electronic device comprises the above liquid crystal display.

In the electronic device, the electronic device can be a mobile phone, a digital still camera, a mobile information terminal device, a notebook computer, a desktop computer, a television, a car display, or a mobile DVD player.

Assuming a liquid crystal display comprises two substrates (e.g. a first substrate and a second substrate) and one of the substrates serves as a display surface of the liquid crystal display. When a finger or a stylus pen touches the display surface (e.g. the second substrate), since the touched substrate is curved according to a center, which is the touched position, the relative position between the two substrates (e.g. a first substrate and a second substrate) are changed. In this embodiment, a plurality of sensors are disposed on the peripheral portions of the two substrates to output detection signals corresponding to the relative positions between the two substrates. Thus, the touched position is determined according to the intensity of the detection signals output from the sensors.

The invention does not limit the method for detecting the relative positions. For example, when the relative positions are changed, electrostatic capacitance or magnetism between the two substrates is changed. Thus, the relative positions can be determined according to the variation of the electrostatic capacitance or the magnetism. In addition, the interlaced position between two substrates can be determined according to the variation of light intensity. Further, mechanistic detection (e.g. metal wires) can be utilized to determine the interlaced position.

In this embodiment, the sensors are disposed on the peripheral portions of the display surface of the liquid crystal display to determine the touched position. Thus, sensors are not disposed on the display surface of the liquid crystal display such that display effect of the liquid crystal display is not reduced.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
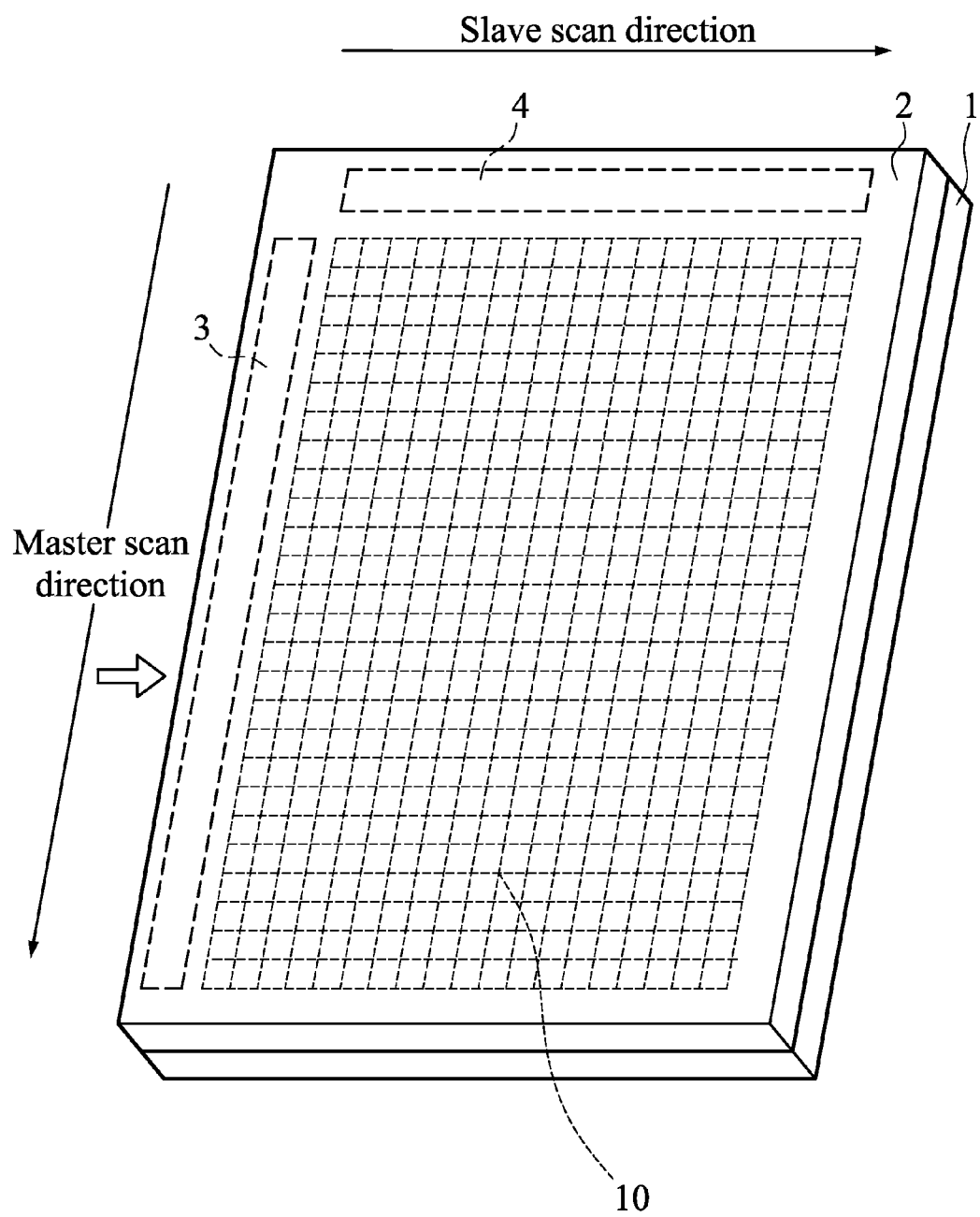
FIG. 1 is a schematic diagram of an exemplary embodiment of the liquid crystal display of the invention.

In this embodiment, a liquid crystal display comprises a detection device to detect and determine a variation in position between two substrates. The result serves as an electrostatic capacitance variation. FIG. 1 is a schematic diagram of an exemplary embodiment of the liquid crystal display of the invention. The liquid crystal display comprises a liquid crystal substrate 1 (first substrate) and a glass substrate 2 (second substrate). The liquid crystal substrate 1 comprises pixel electrodes 10 for pixels. The pixel electrodes 10 are arranged to form a specific shape. The specific shape is array-like. The glass substrate 2 comprises at least one opposite electrode. The liquid crystal substrate 1 and the glass substrate 2 are square and opposing. Liquid crystal component is enclosed between the liquid crystal substrate 1 and the glass substrate 2. Corresponding voltages are provided to the pixel electrodes 10 and the opposite electrode to control the transmittance or the reflectance of the liquid crystal component. Meanwhile, the voltage provided to the pixel electrodes 10 is a data voltage for executing an image display function.

On the peripheral portions of the liquid crystal substrate 1 and the glass substrate 2, there comprise sensor arrays 3 and 4. The sensors arrays 3 and 4 are disposed at peripheral portions of the liquid crystal substrate 1 and the glass substrate 2. In this embodiment, the sensors arrays 3 and 4 are disposed at outside of the pixel electrodes 10 and at outside of the opposite electrode. The sensor arrays 3 and 4 detect and determine a touched position when an object is touching the glass substrate 2. One of the sensor arrays 3 and 4 comprises a plurality of sensors. Each sensor detects and determines a relative position of the liquid crystal substrate 1 and the glass substrate 2. In one embodiment, the sensor arrays 3 and 4 detect variation of the profile position of the liquid crystal substrate 1 and the glass substrate 2. Each sensor is arranged in a master scan direction or a slave scan direction according to a one dimension method (straight line).

Figure 2:
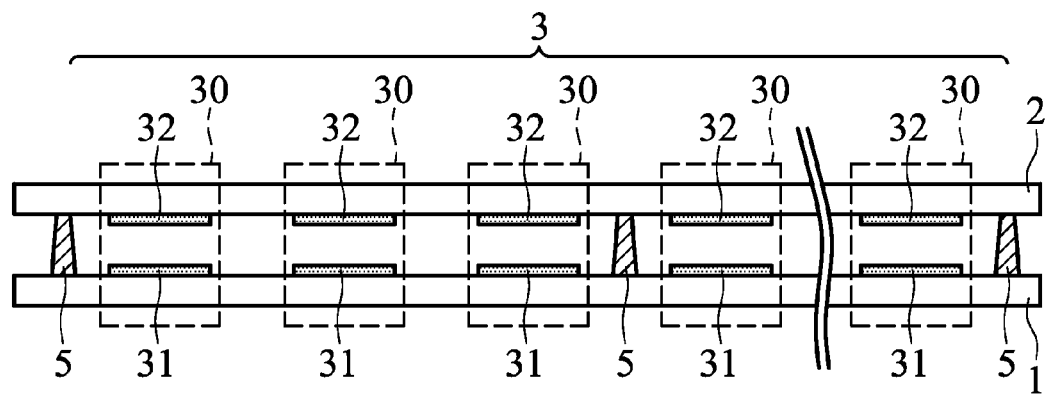
FIG. 2 is a schematic diagram of an exemplary embodiment of the sensor array 3.

FIG. 2 is a schematic diagram of an exemplary embodiment of the sensor array 3. FIG. 2 is a lateral diagram of the liquid crystal device shown in FIG. 1 according to a blank arrowhead direction. The sensor array 3 is arranged on a left-side of the liquid crystal device shown in FIG. 1. The sensor array 3 comprises a plurality of sensors 30. Each sensor 30 comprises a first electrode 31 and a second electrode 32. The first electrode 31 is fixed on a side of the liquid crystal substrate 1. The second electrode 32 is fixed on a side of the glass substrate 2. When a relative position between the liquid crystal substrate 1 and the glass substrate 2 is changed, an electrostatic capacitance between the first electrode 31 and the second electrode 32 is changed and can be detected. A dielectric, which comprises an appropriate electrostatic capacitance, is enclosed between the first electrode 31 and the second electrode 32.

Various methods can be utilized to detect the electrostatic capacitance. One detecting method is where an AC voltage is provided to the electrodes of the sensors and detects the AC voltage in the electrodes to determine the variation of the AC voltage. Another detecting method is where a pulse voltage serves as an AC signal and is provided to the electrodes of the sensors. In this case, the rising edge of the pulse voltage is delayed due to the electrostatic capacitance. Accordingly, electrostatic capacitance variation can be determined according to the rising time of the pulse voltage.

Additionally, intervening objects 5 are disposed between the liquid crystal substrate 1 and the glass substrate 2 to ensure space between the liquid crystal substrate 1 and the glass substrate 2. The distance between the intervening objects 5 is an appropriate distance.

Figure 3:
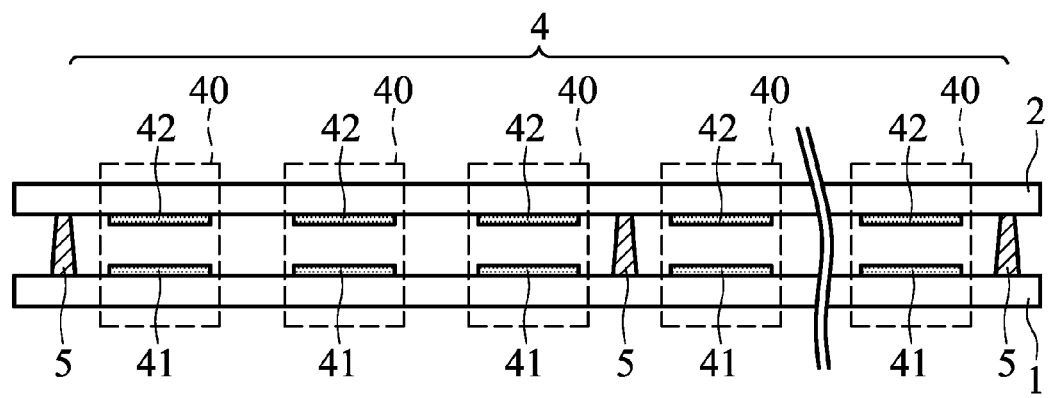
FIG. 3 is a schematic diagram of an exemplary embodiment of the sensor array 4.

FIG. 3 is a schematic diagram of an exemplary embodiment of the sensor array 4. The sensor array 4 is disposed at a top-side of the liquid crystal display shown in FIG. 1. The sensor array 4 comprises a plurality of sensors 40. The structure of each sensor 40 is the same as that of each sensor 30. Each sensor 40 comprises a first electrode 41 and a second electrode 42. The first electrode 41 is fixed on a side of the liquid crystal substrate 1. The second electrode 42 is fixed on a side of the glass substrate 2. When a relative position between the liquid crystal substrate 1 and the glass substrate 2 is changed, an electrostatic capacitance between the first electrode 41 and the second electrode 42 is changed and can be detected. A dielectric, which comprises an appropriate electrostatic capacitance, is enclosed between the first electrode 41 and the second electrode 42.

The number of the sensors 30 and 40, the space between the sensors, and the size (the measure of area of the first and the second electrodes) of the sensors 30 and 40, are determined according to touch position accuracy. If the number of the sensors 30 and 40 is increased, the space between the sensors is reduced, or the size of the sensors 30 and 40 is reduced, touch position accuracy is increased.

Figure 4A:
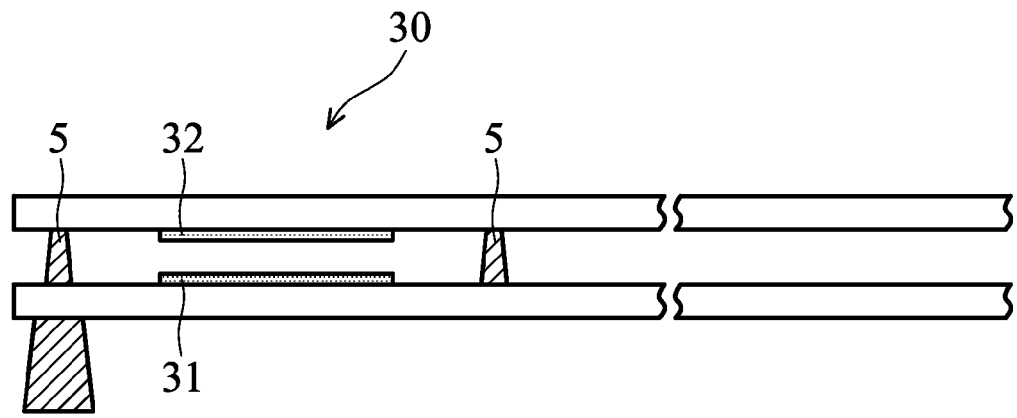
FIG. 4a is a schematic diagram on the peripheral portions of liquid crystal substrate 1 and the glass substrate 2 when an object is not touching the glass substrate 2.
Figure 4B:
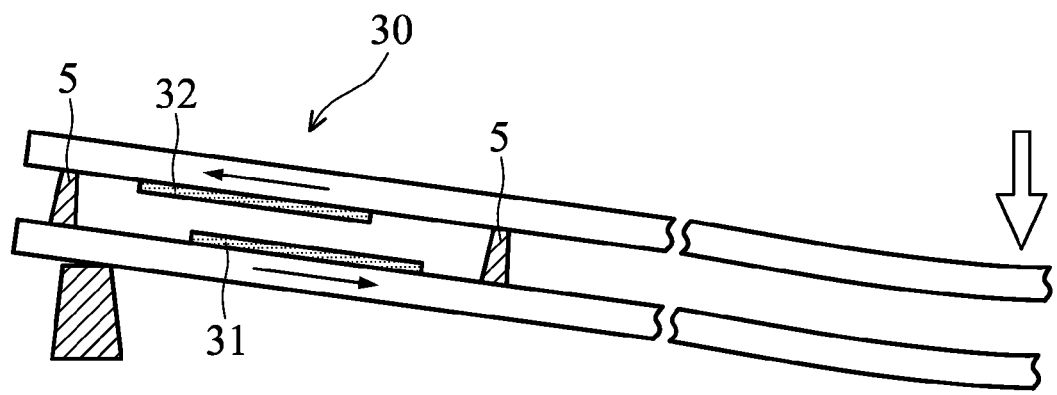
FIG. 4b is a schematic diagram on the peripheral portions of the liquid crystal substrate 1 and the glass substrate 2 when an object is touching the glass substrate 2.

FIG. 4a is a schematic diagram on the peripheral portions of liquid crystal substrate 1 and the glass substrate 2 when an object is not touching the glass substrate 2. FIG. 4b is a schematic diagram on the peripheral portions of the liquid crystal substrate 1 and the glass substrate 2 when an object is touching the glass substrate 2. When the glass substrate 2 is not touched, the first electrode 31 and the second electrode 32 of one sensor 30 are approximately aligned. The distance between the liquid crystal substrate 1 and the glass substrate 2 is maintained at an appropriate distance due to the intervening objects 5. Accordingly, the electrostatic capacitance between the first electrode 31 and the second electrode 32 is maintained at approximately one value if no external issues affect the distance between the liquid crystal substrate 1 and the glass substrate 2.

In addition, as shown in FIG. 4b, if an object is touching the glass substrate 2, the glass substrate 2 is moved depending upon the object such that the liquid crystal substrate 1 is also moved due to the intervening objects 5. Thus, the liquid crystal substrate 1 and the glass substrate 2 are curved according to a center. The center is indicated by a blank arrowhead shown in FIG. 4b. When the curvature shape of the liquid crystal substrate 1 and the glass substrate 2 is like an arc shape, the first electrode 31 and the second electrode 32 are interlaced because the radius of the curvature of the liquid crystal substrate 1 is different from the radius of the curvature of the glass substrate 2. Thus, the electrostatic capacitance between the first electrode 31 and the second electrode 32 is changed.

Since the structures of the sensors 30 and 40 are the same, when an object is not touching the glass substrate 2, the electrostatic capacitance between the first electrode 41 and the second electrode 42 is maintained at approximately one value. When an object is touching the glass substrate 2, the electrostatic capacitance between the first electrode 41 and the second electrode 42 is changed. In other words, the sensors 30 and 40 outputs a signal relating with the variation of the relative position between the liquid crystal substrate 1 and the glass substrate 2, when an object is touching the glass substrate 2.

In this embodiment, the curvature shape of the liquid crystal substrate 1 and the glass substrate 2 is like an arc shape, but the disclosure is not limited thereto. The curvature shape of the liquid crystal substrate 1 and the glass substrate 2 is determined according to the material, the thickness, and the disposed position of the liquid crystal substrate 1 and the glass substrate 2. Thus, variations in the material, the thickness, and the disposed position can be utilized to detect the variation of the relative position between the substrates in other embodiments.

Figure 5:
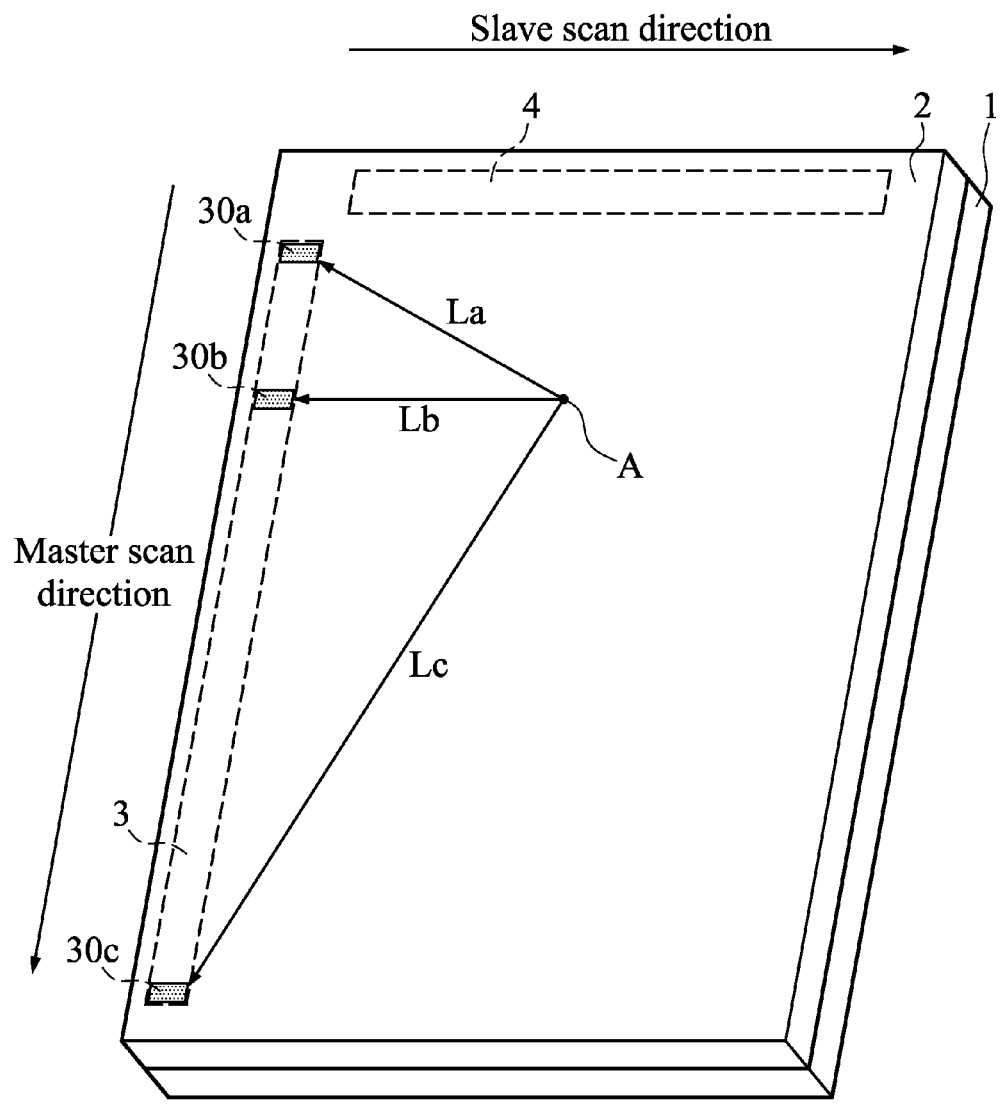
FIG. 5 is a schematic diagram of a method for determining the touched position.
Figure 6:
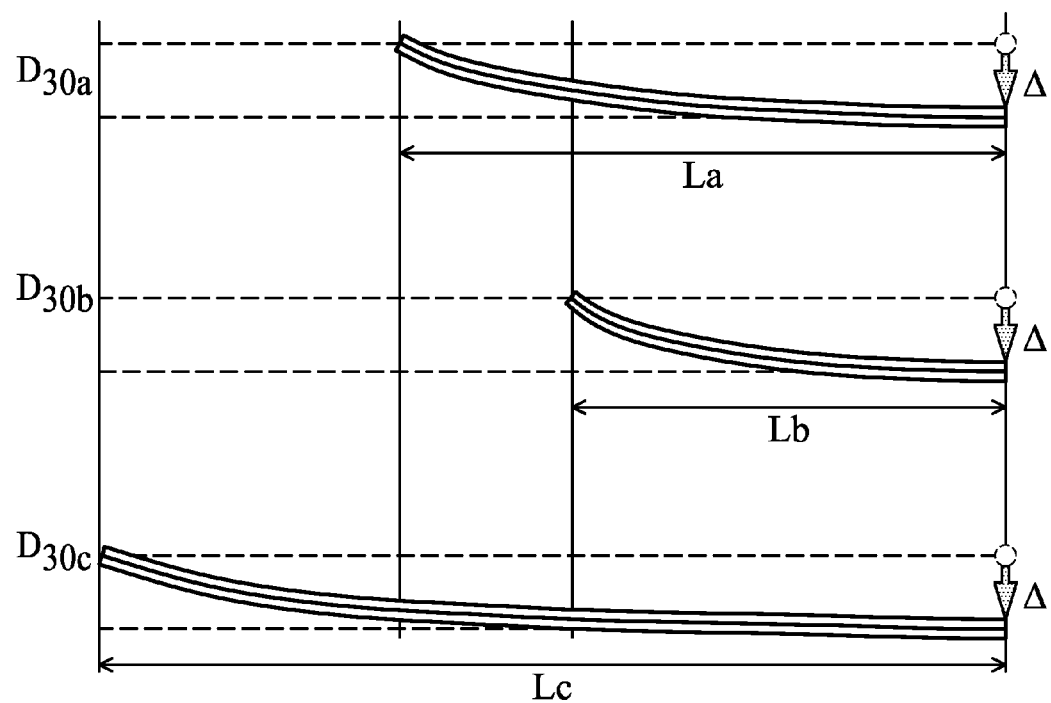
FIG. 6 shows a distance relationship between three sensors 30a~30c and the contact node A.

In this embodiment, the touched position on the glass substrate 2 is determined according to the signals provided by the sensors 30 and 40. FIGS. 5 and 6 are utilized to describe the determination method of the touched position. Assuming an object is touching the glass substrate 2 in a contact node A. The contact node A is located on the surface of the glass substrate 2. The position of the contact node A approaches an upper center of the master scan direction and approaches the center of the slave scan direction.

When an object is touching the glass substrate 2, the glass substrate 2 sustains external force such that the contact node A serves as a center and the liquid crystal substrate 1 and the glass substrate 2 are curved. Thus, the distance between each sensor 30 and the contact node A is affected. Similarly, the distance between each sensor 40 and the contact node A is also affected When the distance between one sensor 30 (40) and the contact node A is short, since the radius of the curvature of the liquid crystal substrate 1 and the glass substrate 2 are short, the shift between the first electrode 31 and the second electrode 32 of the sensor 30 (or the first electrode 41 and the second electrode 42 of the sensor 40) is large. Furthermore, when the distance between one sensor 30 (40) and the contact node A is long, since the radius of the curvature of the liquid crystal substrate 1 and the glass substrate 2 are large, the shift between the first electrode 31 and the second electrode 32 of the sensor 30 (or the first electrode 41 and the second electrode 42 of the sensor 40) is small.

FIGS. 5 and 6 are utilized to describe the embodiments. FIG. 6 shows a distance relationship between three sensors 30a~30c and the contact node A. The symbol $D_{30a}$ represents a cross-section passing through the sensor 30a and the contact node A. The symbol $D_{30b}$ a cross-section passing through the sensor 30b and the contact node A. The symbol $D_{30c}$ a cross-section passing through the sensor 30c and the contact node A. The distance Lb between the sensor 30b and the contact node A is shorter than the distance La between the sensor 30a and the contact node A and shorter than the distance Lc between the sensor 30c and the contact node A. The distance Lc between the sensor 30c and the contact node A is longer than the distance La between the sensor 30a and the contact node A and longer than the distance Lb between the sensor 30b and the contact node A. The relation among the distances La~Lc is Lb<La<Lc.

A variation amount Δ between the liquid crystal substrate 1 and the glass substrate 2 is generated because an object is touching the glass substrate 2 in the contact node A. For the sensors 30a~30c, the variation amount Δ are the same. Therefore, the shift amount between the liquid crystal substrate 1 and the glass substrate 2 is large in the position of the sensor 30b, wherein the distance Lb between the sensor 30b and the contact node A is shorter than the distances La and Lc. Contrarily, the shift amount between the liquid crystal substrate 1 and the glass substrate 2 is small in the position of the sensor 30c, wherein the distance Lc between the sensor 30c and the contact node A is longer than the distances La and Lb. The variation amount of the electrostatic capacitance of each sensor depends upon the distance between the sensor and the contact node A. Accordingly, when the distance between a sensor and the contact node A is short, the variation amount of the electrostatic capacitance of the sensor is large.

Figure 7A:
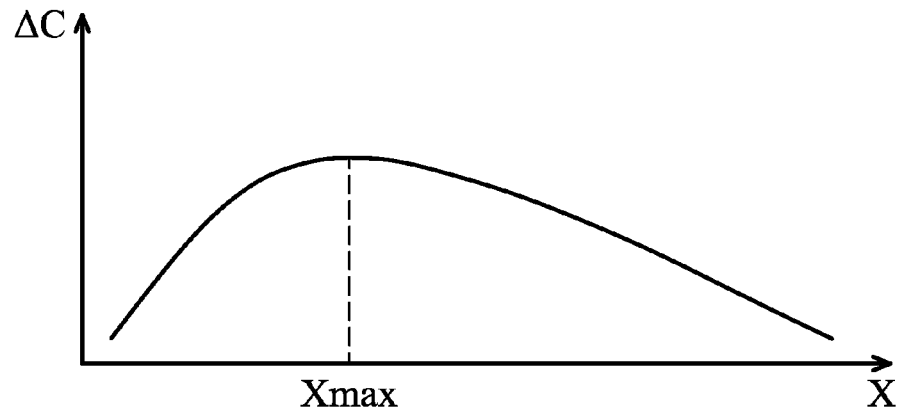
FIGS. 7a and 7b shows electrostatic capacitance variation relationships of the sensor arrays 3 and 4.
Figure 7B:
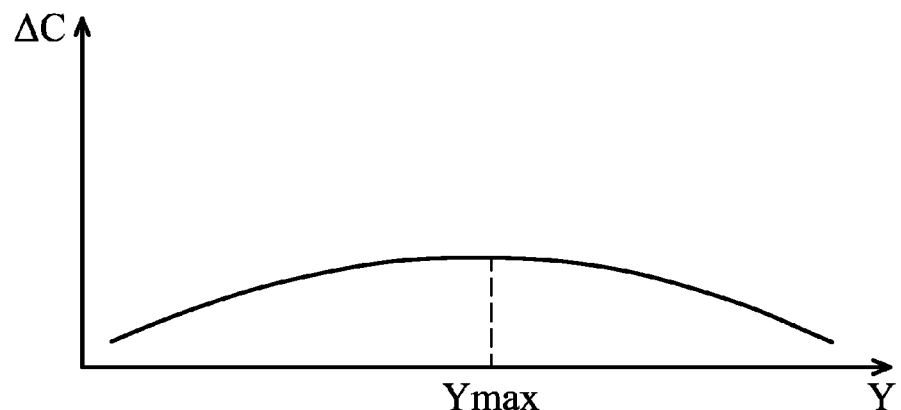

FIG. 7a shows electrostatic capacitance variation relationships of the sensor array 3. FIG. 7b shows electrostatic capacitance variation relationships of the sensor array 4. The vertical axis represents the variation amount ΔC of the electrostatic capacitance. The horizontal axis represents the sensors.

As shown in FIG. 7a or 7b, the variation amount ΔC of the electrostatic capacitance is changed depending on the position of the sensors. When the distance between a touched position and the sensor is short, the variation amount ΔC of the electrostatic capacitance is large. In other words, if a maximum variation amount ΔC of the electrostatic capacitance is determined, the position of the sensor, corresponding to the maximum variation amount ΔC, represents the touched position. The coordinate of the contact node A shown in FIG. 5 is (Xmax, Ymax) according to FIGS. 7a and 7b.

Figure 8:
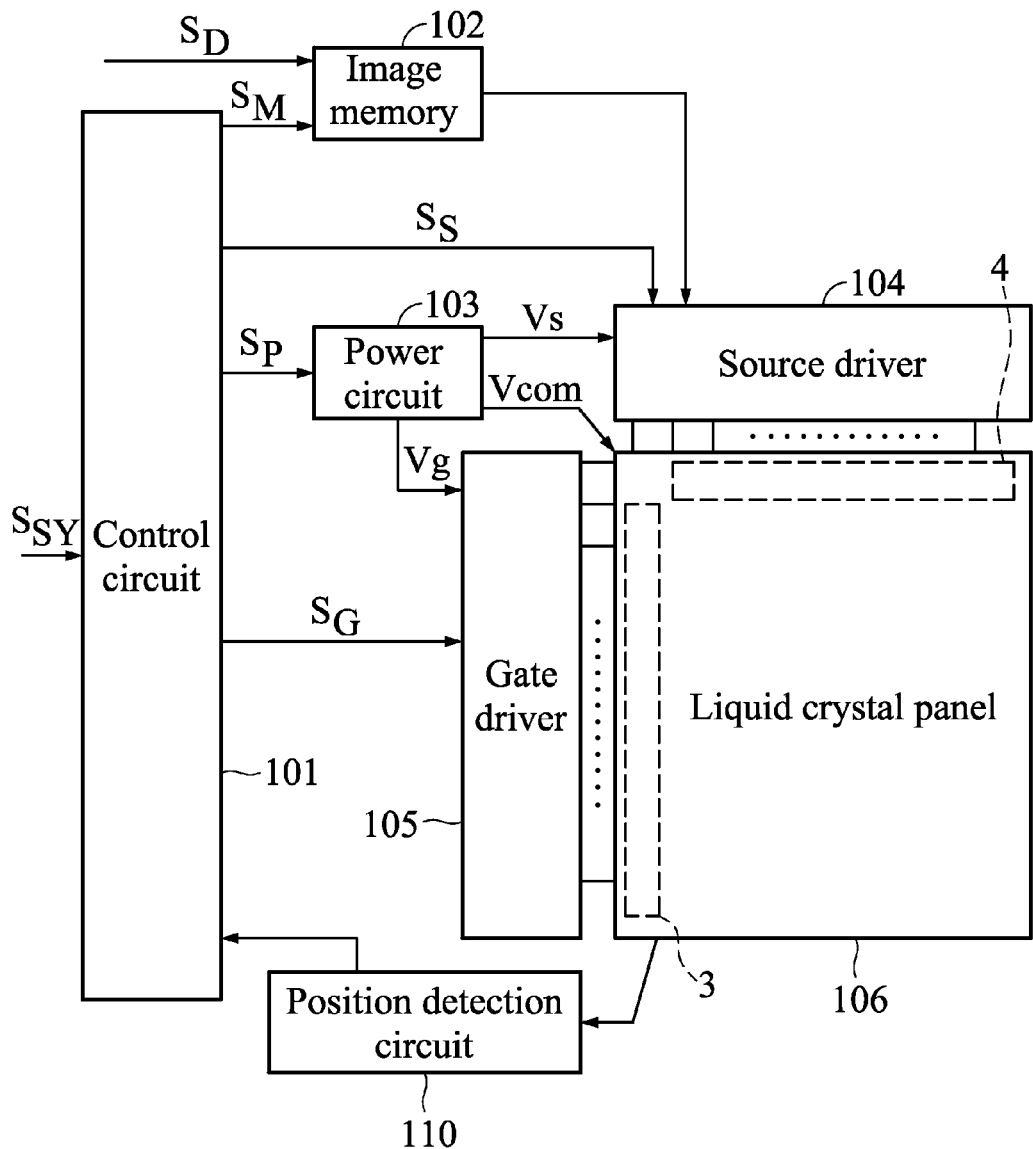
FIG. 8 shows a structure of an active array liquid crystal device.

FIG. 8 is a schematic diagram of an exemplary embodiment of a liquid crystal device. The liquid crystal device can be a reflection type liquid crystal device. The reflection type liquid crystal device utilizes reflected light to display image. The liquid crystal device comprises a control circuit 101, an image memory 102, a power circuit 103, a source driver 104, a gate driver 105, and a liquid crystal panel 106. The liquid crystal panel 106 comprises the liquid crystal substrate 1, the glass substrate 2, and the sensor arrays 3 and 4.

FIG. 8 shows a structure of an active array liquid crystal device, but the disclosure is not limited thereto. In other embodiments, other structures may be utilized. A structure may utilize two substrates to execute a liquid crystal display function. For example, a Super Twisted Nematic (STN) liquid crystal device is utilized. Additionally, the liquid crystal device can be applied in an electronic devices (e.g. a computer, a digital watch, a digital clock, a time keeper) to display numerals or words.

The control circuit 101 generates a memory control signal $S_M$, a power control signal $S_P$, a source control signal $S_S$, and a gate control signal $S_G$ according to a synchronous signal Ssy. The memory control signal $S_M$ is transmitted to the image memory 102. The power control signal $S_P$ is transmitted to the power circuit 103. The source control signal $S_S$ is transmitted to the source driver 104. The gate control signal $S_G$ is transmitted to the gate driver 105.

The image memory 102 provisionally stores the input display data $S_D$ and is synchronized with the memory control signal $S_M$ to provide the stored display data $S_D$ to the source driver 104. Further, the image memory 102 can be integrated into the control circuit 101 and execute internal processing therein.

The synchronous signal Ssy and the display data $S_D$ are provided by a Central Processing Unit (CPU) of a mobile phone or a mobile game machine, a control Integrated Circuit (IC) of a Liquid Crystal Display (LCD), or an analog-to-digital converter (ADC) of a Cathode Ray Tube (CRT) of a Personal Computer (PC). The control circuit 101 directly controls signals stored in a video RAM of a PC.

The power circuit 103 generates driving voltages Vs, Vg, and a common voltage Vcom according to the power control signal $S_P$ generated by the control circuit 101. The driving voltage Vs is provided to the source driver 104. The driving voltage Vg is provided to the gate driver 105. The common voltage Vcom is provided to the liquid crystal panel 106. Further, the power circuit 103 provides voltage to the sensor arrays 3 and 4 and provides the voltage to the sensors 30 and 40 of the sensor arrays 3 and 4 to determine the touched position on the glass substrate 2.

The gate driver 105 sequentially provides scan voltages to scan lines of the liquid crystal panel 106 according to the gate control signal $S_G$. The scan voltages are turned on or off switching elements (not shown). The gate driver 105 provides the scan voltages to an output port for turning on all of the switching elements and then provides the scan signals to the scan lines of the liquid crystal panel 106.

The source driver 104 outputs data voltage to data lines of the liquid crystal panel 106 according to the source control signal $S_S$. The source driver 104 captures the display data stored in the image memory 102 and generates the data voltage according to the captured display data. The source driver 104 is capable of providing an external voltage to all of the data lines of the liquid crystal panel 106. At this time, the source driver 104 is not synchronized with the source control signal $S_S$. The external voltage is provided by an external power source.

The liquid crystal panel 106 comprises the liquid crystal substrate 1, the glass substrate 2, and the liquid crystal component. The liquid crystal substrate 1 comprises pixel electrodes 10 for pixels. The pixel electrodes 10 are arranged to form a specific shape. The specific shape is array-like. The glass substrate 2 comprises at least one opposite electrode (common electrode). The liquid crystal component is enclosed between the liquid crystal substrate 1 and the glass substrate 2. Voltages, provided to the liquid crystal substrate 1 and the glass substrate 2, are controlled to turn on or off switching elements. When one switching element is turned on, data voltages are applied between pixel electrodes and the opposite electrode to control the transmittance or reflectance of the liquid crystal component to execute image display functions.

In addition, the power circuit 103 provides AC voltages to the sensors 30 and 40 of the sensor arrays 3 and 4. A position detection circuit 110 captures variations of the electrostatic capacitance of the sensors 30 and 40 and determines a specific sensor, which comprises the maximum variation of the electrostatic capacitance. The position detection circuit 110 obtains the touched position on the glass substrate 2 according to the position of the specific sensor. The invention does not limit the method of finding out the specific sensor.

The position detection circuit 110 notifies the control circuit 101 of the information related to the touched position on the glass substrate 2. The control circuit 101 executes appropriate processing functions according to the notified information.

In this embodiment, the variation of the electrostatic capacitance is determined according to the relative position of the two substrates (e.g. the liquid crystal substrate 1 and the glass substrate 2). In other embodiment, the method for detecting the relative position can be replaced by other methods. For example, when the relative position of the two substrates is changed, magnetism or optics (quantity of light) may be changed. Thus, a magnetic sensor or an optics sensor can be utilized to detect the variation of the magnetism or optics. In some embodiments, a metal line is utilized to detect mechanical variation. Thus, the relative position of the two substrates can be determined.

In this embodiment, the position detection circuit 110 is utilized to detect the touched position. In another embodiment, the control circuit 101 is used to detect the touched position. If the liquid crystal element is a low temperature poly-silicon liquid crystal element, the position detection circuit 110 can be combined with the liquid crystal element.

Further, in this embodiment, the sensor arrays 3 and 4 are disposed at the left-side and upper-side of the liquid crystal panel 106, but the disclosure is not limited thereto. In other embodiments, the sensor arrays 3 and 4 can be disposed at the right-side and lower-side of the liquid crystal panel 106. In some embodiment, the sensor arrays can be disposed at the left-side and right-side or in the upper-side and the lower-side.

Additionally, a portion of sensors 30 and 40 of the sensor arrays 3 and 4 are not utilized. The utilized number of the sensors 30 and 40 depend with the number of activable contact nodes on the glass substrate 2. The utilized number of the sensors 30 and 40 may be increased or reduced.

In this embodiment, a mobile phone is given as an example of an electrode device, but the disclosure is not limited thereto.

Figure 9:
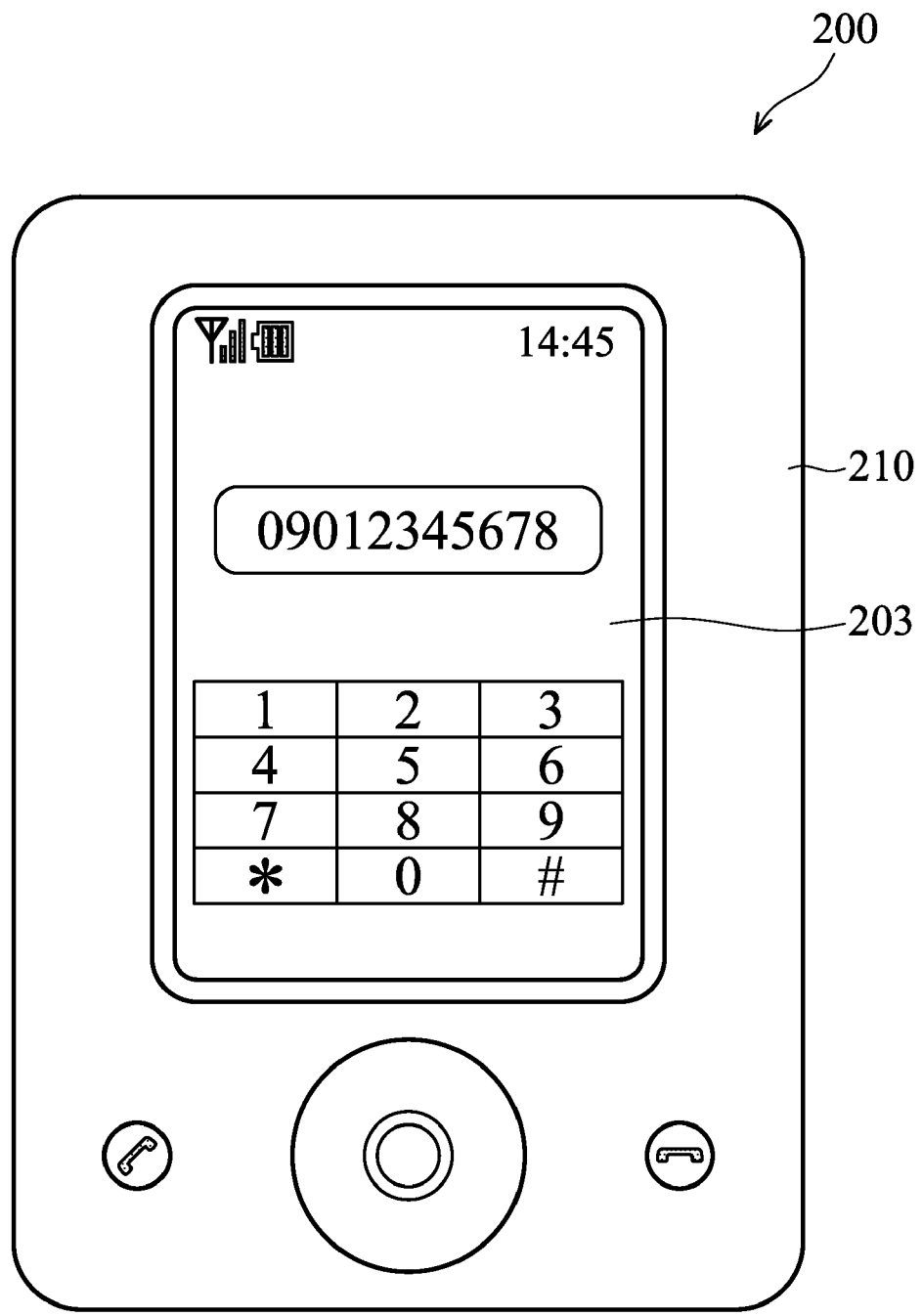
FIG. 9 is a schematic diagram of an exemplary embodiment of a mobile phone of the invention.

FIG. 9 is a schematic diagram of an exemplary embodiment of a mobile phone of the invention. The mobile phone 200 comprises a case 210 and a liquid crystal display 203. The case 210 accommodates various circuits. The front of the mobile phone 200 is shown in FIG. 9. In the front of the mobile phone 200, a portion of the front is the liquid crystal display 203. The structure of the liquid crystal display 203 is the same as that of the liquid crystal display shown in FIG. 1. The liquid crystal display 203 displays the necessary information for users to operate the mobile phone 200. When the user touches the surface of the liquid crystal display 203, the touched position is determined according to the variation of the relative position of the two substrate of the liquid crystal display 203.

Figure 10:
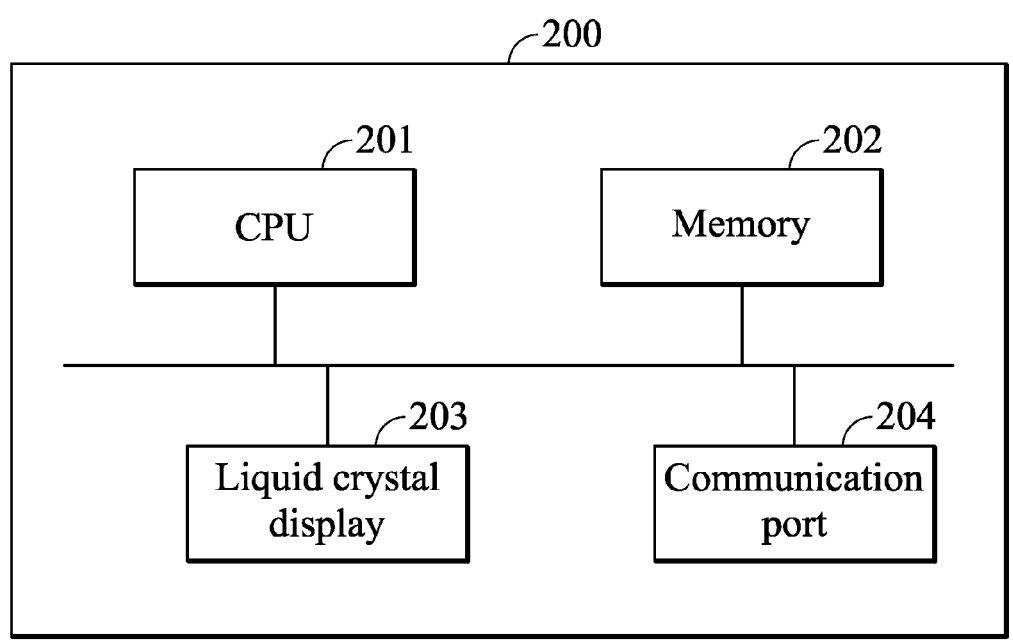
FIG. 10 is a block diagram of an exemplary embodiment of the mobile phone.

FIG. 10 is a block diagram of an exemplary embodiment of the mobile phone. The mobile phone 200 comprises a CPU 201, a memory 202, a liquid crystal display 203, and a communication port 204. The CPU 201 controls all devices. The memory 202 stores control programs and user data. All devices are controlled by the control programs. The liquid crystal display 203 displays information for users and receives operation commands provided by the user. The communication port 204 communicates with a mobile phone network or a data communication network to execute an external communication function.

The CPU 201 generates LCD signals to the liquid crystal display 203. The LCD signals will be displayed on the liquid crystal display 203. The liquid crystal display 203 executes display function according to the LCD signals.

Further, the liquid crystal display 203 detects variations of the relative position of the two substrates and provides the detection result to the CPU 201 to obtain a contact node. The CPU 201 executes appropriate processing commands according to the detection result. One appropriate processing command is to store information, which is input by users, in the memory 202. The CPU 201 generates new LCD signals according to the stored information. The new LCD signals are utilized such that the liquid crystal display 203 displays a next image. Then, the communication port 204 is controlled by the appropriate processing command to communicate with an external communication device.

The electronic device may be a mobile information terminal device such as a Digital Still Camera (DSC), or a Personal Digital Assistant (PDA). The electronic device can be a notebook computer, or a mobile DVD player. In addition, the electronic device can be a device operated by user. The device can be an electronic dictionary, an electronic calculator, a time keeper, a mobile game machine, a multimedia player, which comprises a hard disk drive (HDD) or a flash memory, a remote control, which operates other electronic devices from a distance end, a digital video camera, which comprises a monitor, or a keyboard of a PC.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal display, comprising:
a first substrate comprising a plurality of pixel electrodes;
a second substrate comprising at least one opposite electrode and passed through by light, wherein a liquid crystal component is enclosed between the first and the second substrates, and a voltage between the first and the second substrates is controlled to display an image;
a plurality of sensors disposed at peripheral portions of the first and the second substrates and outputting signals corresponding to relative positions of the first and the second substrates;
a position detection device receiving the signals output from the sensors to determine a touched position on the glass substrate, wherein each sensor comprises a first electrode and a second electrode, the position detection device detects variations of an overlap area between the first and the second electrodes when the relative position between the first and the second substrates is changed.

2. The liquid crystal display as claimed in claim 1, wherein a space exist between the first and the second substrates, and the sensors are disposed at the space and coupled to the first and the second substrates.

3. The liquid crystal display as claimed in claim 1, wherein the first electrode is fixed on the first substrate, the second electrode is fixed on the second substrate, and the position detection device detects variations of the electrostatic capacitance between the first and the second electrodes when the relative position between the first and the second substrates is changed.

4. An electronic device comprising a liquid crystal display as claimed in claim 1.

5. The electronic device as claimed in claim 4, wherein the electronic device is a mobile phone, a digital still camera, a mobile information terminal device, a notebook computer, a desktop computer, a television, a car display, or a mobile DVD player.

* * * * *